United States Patent [19]
Price et al.

[11] Patent Number: 5,941,922
[45] Date of Patent: Aug. 24, 1999

[54] GEAR AVAILABILITY AND SYNCHRONIZATION INDICATOR AND METHOD

[75] Inventors: Kent H. Price, Grandville; Robert J. Young, Newaygo, both of Mich.

[73] Assignee: Johnson Manufacturing Company, Grandville, Mich.

[21] Appl. No.: 08/769,956

[22] Filed: Dec. 19, 1996

Related U.S. Application Data

[60] Provisional application No. 60/012,153, Feb. 23, 1996.

[51] Int. Cl.⁶ ................................ F16H 3/42; B60Q 9/00
[52] U.S. Cl. ............................ 701/51; 701/55; 701/56; 477/110; 477/111; 340/456; 340/439
[58] Field of Search ............................ 701/51, 52, 55, 701/56; 477/34, 43, 46, 80, 111, 110, 108, 115; 74/333, 334, 335, 336 R; 340/456, 439

[56] References Cited

U.S. PATENT DOCUMENTS

| | | | |
|---|---|---|---|
| 4,101,870 | 7/1978 | Ekman | 340/459 |
| 4,161,717 | 7/1979 | Hoover et al. | 340/441 |
| 4,320,381 | 3/1982 | Olivier | 340/439 |
| 4,355,296 | 10/1982 | Drone | 340/439 |
| 4,419,654 | 12/1983 | Funk | 303/124 |
| 4,555,691 | 11/1985 | Hosaka et al. | 340/439 |
| 4,622,637 | 11/1986 | Tomita et al. | 701/64 |
| 4,631,515 | 12/1986 | Blee et al. | 340/439 |
| 4,701,852 | 10/1987 | Ulveland | 701/64 |
| 4,703,304 | 10/1987 | Muguruma et al. | 477/107 |
| 4,723,215 | 2/1988 | Hibino et al. | 701/123 |
| 4,752,883 | 6/1988 | Asakura et al. | 701/64 |
| 4,800,360 | 1/1989 | Dunkley et al. | 340/456 |
| 4,853,673 | 8/1989 | Kido et al. | 701/66 |
| 5,017,916 | 5/1991 | Londt et al. | 701/64 |
| 5,020,361 | 6/1991 | Malecki et al. | 73/118.1 |
| 5,021,764 | 6/1991 | Mabee | 340/439 |
| 5,429,559 | 7/1995 | Steeby | 477/80 |
| 5,638,271 | 6/1997 | White et al. | 701/64 |

OTHER PUBLICATIONS

Ruth Jones; Test–driving Rockwell's New ESS; Land Line; Jul./Aug. 1996; pp. 29 & 85.
Cruise King Cruise Control Installation Manual.
Automated Rockwell Transmissions Cut Workload; Driving With ESS: Gear Jammers, Take Heart; Trade Journal Unknown.

*Primary Examiner*—Tan Q. Nguyen
*Attorney, Agent, or Firm*—Rader, Fishman, Grauer & McGarry

[57] ABSTRACT

A gear availability indicator for multi-gear transmissions of motor vehicles includes a signal processing unit for receiving input signals representative of vehicle speed and engine speed. The signal processing unit can determine a gear ratio value representative of the relationship between vehicle speed and engine speed for each gear in the vehicle transmission and can generate output signals for operation of a display. The display includes a first section displaying a range of acceptable engine speeds and a second section displaying gear symbols representative of gear ratio values. The displayed range of acceptable engine speeds and the displayed gear symbols are relatively moveable. The mutual alignment of the displayed range of acceptable engine speeds and one or more of the displayed gear symbols indicates that one or more gears represented by the one or more gear symbols are available for engagement in the transmission. A method of calibrating the gear availability indicator includes operating the vehicle at a predetermined velocity and the engine at a predetermined rate of revolution, operating the vehicle with the transmission engaged in one of the gears while monitoring the vehicle speed and engine rate of revolution, and calculating a gear ratio for the engaged gear from the monitored vehicle speed and engine rate of revolution.

22 Claims, 5 Drawing Sheets

GEAR AVAILABILITY AND SYNCHRONIZATION INDICATOR AND METHOD

This application claims the benefit of U.S. Provisional Application No. 60/012,153 filed on Feb. 23, 1996.

BACKGROUND OF THE INVENTION

1. Field of the Invention

This invention relates to a method and apparatus for indicating to a vehicle operator the range of transmission gears that are available for selection by the vehicle operator at the existing vehicle speed within a predetermined range of engine speeds and the engine speed at which the transmission may be shifted synchronously into each of the gears. This invention also relates to a method for calibrating the apparatus for virtually any vehicle equipped with a manual transmission.

2. Description of the Related Art

Heavy trucks generally employ manual transmissions having a relatively large number of gears. Such transmissions usually are non-synchromesh transmissions, which require that the driven gears and driving gears be rotated at very nearly the same speed before they can intermesh. Thus, for any particular vehicle speed, it is necessary to match the engine speed with the vehicle speed for the particular gear selected before that gear can be engaged.

In order to match engine speed with vehicle speed for a given gear ratio, it is usually necessary to "double clutch" the transmission. This procedure involves first shifting the transmission into neutral and then adjusting the engine speed up or down to match the intended gear and then depressing the clutch and shifting the transmission into that gear.

Experienced truck drivers usually get a feel for what transmission gears are available under normal driving conditions and what engine speeds are necessary to engage the gears. This is frequently a matter of sensitivity to the sound of the engine in comparison with vehicle speed. Inexperienced operators and even experienced operators in emergencies or under other stressful conditions (e.g., downhill acceleration) have difficultly in determining what gears are available for a particular vehicle speed.

A number of devices have been invented to assist the vehicle operator in shifting smoothly into the next higher or lower gear. One such device is disclosed in U.S. Pat. No. 4,320,381 to Olivier, wherein a display has a fixed set of numerals representing gear ratios and a rotatable pointer. When the pointer is aligned with one of the numerals, the particular gear associated with the numeral can be engaged. There is no indication in this patent if the engine RPM is within an acceptable range for shifting. The device is useful only for the particular transmission for which it is designed, and is not universally adaptable to other transmissions. U.S. Pat. No. 4,800,360 to Dunkley et al. discloses a vehicle display and control device for semi-blocked transmissions. The display is divided into a first section that indicates the presently engaged gear, a second section that indicates a number of gears available above the presently engaged gear, and a third section that indicates a number of gears that are available below the presently engaged gear. The Dunkley et al. patent takes control of the shifting operation when a joystick is manipulated by a vehicle operator. As in the Olivier patent, the Dunkley et al. patent is not universally adaptable to manual multi-gear transmissions and does not visually indicate when a chosen target gear exceeds the permissible engine speed range.

SUMMARY OF THE INVENTION

The present invention provides an improved apparatus and method that facilitates gear availability determination by a vehicle operator within a safe engine speed range for the existing vehicle speed and makes it simple for the operator to match engine speed with vehicle speed in order to engage any of the available gears on a manual transmission. Another object of the present invention is to provide a gear availability indicating device that can be easily calibrated for any vehicle having a manual transmission without requiring any knowledge or information relating to actual gear ratios present in the vehicle.

A gear availability indicator for multi-gear transmissions of motor vehicles according to the present invention includes a signal processing unit for receiving input signals representative of vehicle speed and engine speed. The signal processing unit can determine a gear ratio value representative of the relationship between vehicle speed and engine speed for each gear in the vehicle transmission and can generate output signals for operation of a display. According to one feature of the invention the display comprises a first section displaying a range of acceptable engine speeds and a second section displaying one or more gear symbols, each representing a gear ratio value. Preferably, the displayed range of acceptable engine speeds and the one or more displayed symbols are relatively moveable. The mutual alignment of the displayed range of acceptable engine speeds and the one or more gear symbols indicates that one or more gears represented by the one or more gear symbols are available for engagement in the transmission.

In one embodiment, the displayed range of engine speeds is stationary and the one or more gear symbols are scrollable past the stationary range. The amount of relative movement between the stationary range and the scrolling gear symbols is a function of the speed of the vehicle.

In another embodiment, the one or more displayed gear symbols are stationary and the displayed range of engine speeds is scrollable past the one or more stationary gear symbols.

Preferably, the display includes a third section that has a scrolling engine speed indicator. Alignment of the indicator with one of the scrolling gear symbols indicates that the transmission is either in a gear as represented by the one scrolling gear symbol or can be synchronously shifted into the gear.

According to a further aspect of the invention, at least one switch is electrically connected to the signal processing unit and actuable by a vehicle operator to specify a target gear within the range of available displayed gear symbols. An actuator is adapted for connection to an engine speed control of the vehicle and is responsive to output signals from the signal processing unit based upon a specified target gear. The engine speed can be automatically adjusted to permit synchronous shifting of the transmission into the specified target gear. This eliminates necessity of intervention from the vehicle operator to "find" the correct engine speed for shifting into the target gear.

According to another aspect of the invention, a method of calibrating a gear availability indicator for a vehicle having an engine and a multi-gear transmission, wherein the indicator includes a signal processing unit for receiving input signals representative of vehicle speed and engine speed and for determining a gear ratio value representative of the relationship between vehicle speed and engine speed for each gear in the vehicle transmission and for generating output signals for operation of a display, includes operating the vehicle at a predetermined speed and recording the speed in the signal processing unit, operating the engine at a predetermined rate of revolution and recording the rate in the signal processing unit, operating the vehicle with the transmission engaged in one of the gears while monitoring the vehicle speed and engine rate of revolution in the signal processing unit, and calculating a gear ratio for the engaged gear from the monitored vehicle speed and engine rate of revolution. Preferably, the step of operating the vehicle with the transmission engaged in one of the gears and the step of calculating a gear ratio for the engaged gear are performed for each of the remaining gears in the multi-gear transmission.

According to an even further aspect of the invention, a method of displaying information useful in changing gears in a manually operated multi-gear transmission of a motor vehicle includes providing an indicator having a display controlled by a signal processing unit, the signal processing unit being adapted for receiving signals representative of vehicle speed and engine speed and for determining a gear ratio value representative of the relationship between vehicle speed and engine speed for each gear in the vehicle transmission and for generating output signals for operation of the display, displaying a range of acceptable engine speeds and one or more gear symbols representative of one or more gear ratio values on the display, and moving one of the displayed range and the one or more gear symbols with respect to the other. Mutual alignment of the displayed range of acceptable engine speeds and the one or more displayed gear symbols indicates that one or more gears represented by the one or more gear symbols are available for engagement in the transmission.

An important feature of the present invention, aside from the range of information provided by the visual display, is the ease with which the information can be perceived by an operator, even under the stressful conditions of an emergency.

Another important feature is that the apparatus can be used in most any vehicle and does not require any knowledge of the gear ratios, drive trains, wheel diameters, etc., or other peculiarities of the vehicle. The apparatus is installed by connecting the apparatus to electronic sensors representing engine speed and vehicle speed (which are usually already present in a vehicle) and by actuating calibration buttons to calibrate the unit to the vehicle and each of the gears in the transmission. With this information, the computer processor of the present invention produces a moving scale that depicts the gears available within a predetermined range of engine speeds. This scale is displayed clearly on the display such that the operator can, at a glance, determine which gears are available and which are preferable and can by a simple match needle operation match engine speed with a selected gear so that the selected gear can be engaged.

According to a further aspect of the invention, the visual display can be a CRT screen, a simple digital or LED display, mechanical pointers, etc.

These and other objects, features and advantages will be apparent from the ensuing description taken in conjunction with the accompanying drawings.

BRIEF DESCRIPTION OF THE DRAWINGS

The invention will now be described with reference to the drawings in which.

DETAILED DESCRIPTION OF THE PREFERRED EMBODIMENTS

Figure 1:
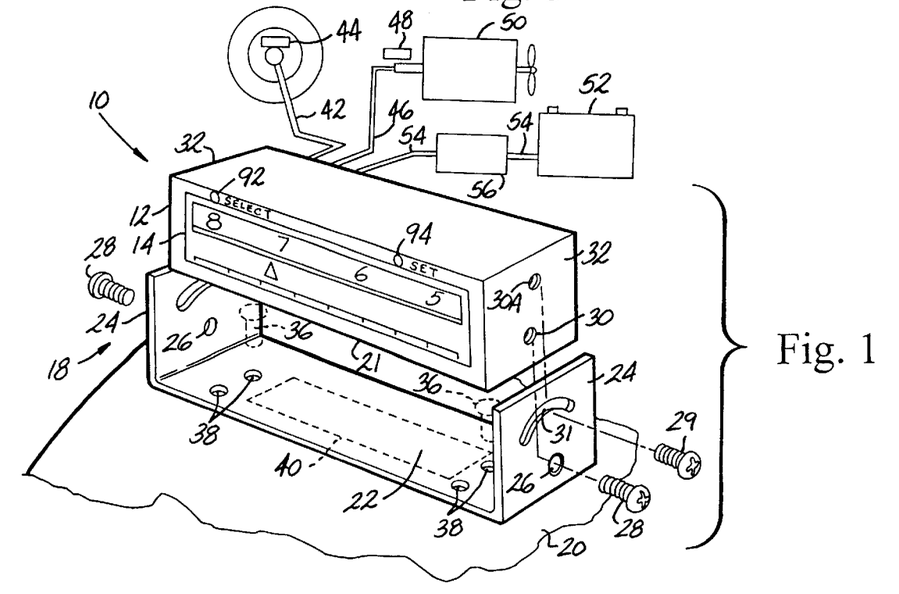
FIG. 1 is an exploded perspective view of the gear availability indicator and illustrating the manner in which it may be mounted in a vehicle.

Referring now to the drawings and more particularly to FIG. 1, a gear availability indicator 10 comprises a housing 12 having a display 14 on a front face thereof. The housing 12 is mounted in a bracket 18, which is in turn mounted to a surface such as a dashboard 20 of a truck. The bracket 18 comprises a back plate 22 and perpendicular end plates 24, each of which has one or more apertures 26 therein. The fasteners 28 extend through the apertures 26 and into openings 30 in ends 32 of the indicator housing 12.

Figure 2:
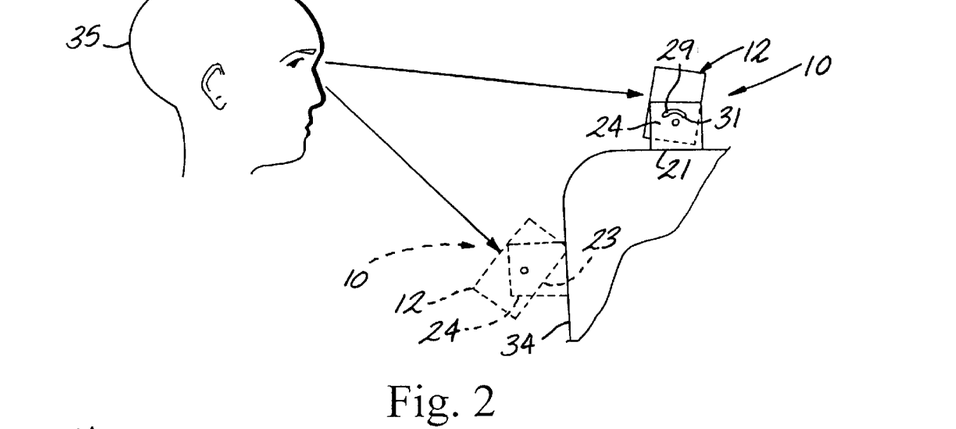
FIG. 2 is a schematic view showing possible alternative mounting positions of the gear availability indicator in a vehicle.

As shown in FIG. 2, bracket 18 can either be mounted on a horizontal surface 20 of a vehicle or on a vertical surface 34. The bottom 21 of the housing 12 is positioned adjacent the back plate 22 when the indicator is mounted on the horizontal surface 20, as represented by the housing 12 in FIGS. 1 and 2, whereas the back 23 of the housing 12 (the side opposite the display screen 14) is adjacent to the back plate 22 when the indicator is mounted on the vertical surface 34, as shown by housing 12 in dashed line in FIG. 2. This mounting mechanism facilities positioning and adjustment of the indicator in any particular vehicle. By using only a single fastener 28 in each end of the housing 12, the housing can also be pivoted with respect to the back plate 22. This further improves the adjustability of the viewing angle of the mechanism. A second fastener 29 that rides in an arcuate slot 31 in the end plate 24 also provides for pivotal adjustment of the indicator and selves to secure the indicator in an adjusted position.

To mount the mechanism, the back plate 22 is first mounted to the vehicle by fasteners 36 that extend through openings 38 in the back plate. A pressure sensitive adhesive or Velcro™ strip 40 on the back plate 22 could be used in addition or alternatives to the fasteners 36. Once the back plate 22 is mounted securely, the housing 12 is mounted between the end plates 24 by the fasteners 28.

The indicator 10 may alternatively be mounted to a sun visor through a clip mechanism (not shown) or may be attached to the roof of a vehicle.

The indicator 10 includes an electrical cable 42 that extends to a sensor 44 to detect the speed of the vehicle. An electrical cable 46 extends to a sensor 48 that detects the speed of rotation of the engine 50 of the vehicle. While other types of sensors could work, in a typical installation, the existing sensors for a speedometer and tachometer on a truck are of the pulse-generation type that generate electrical pulses representative of the engine speed and vehicle speed. The pulses are transmitted to electronic circuitry that is calibrated in a well known manner to indicate vehicle speed in miles per hour (mph) or kilometers per hour and engine speed in revolutions per minute (RPM). The indicator 10 receives its power from the vehicle battery 52 by a power cord 54 which can be connected to the battery through a cigarette lighter or hard wired into the system, such as a fuse box shown schematically at 56.

Figure 3:
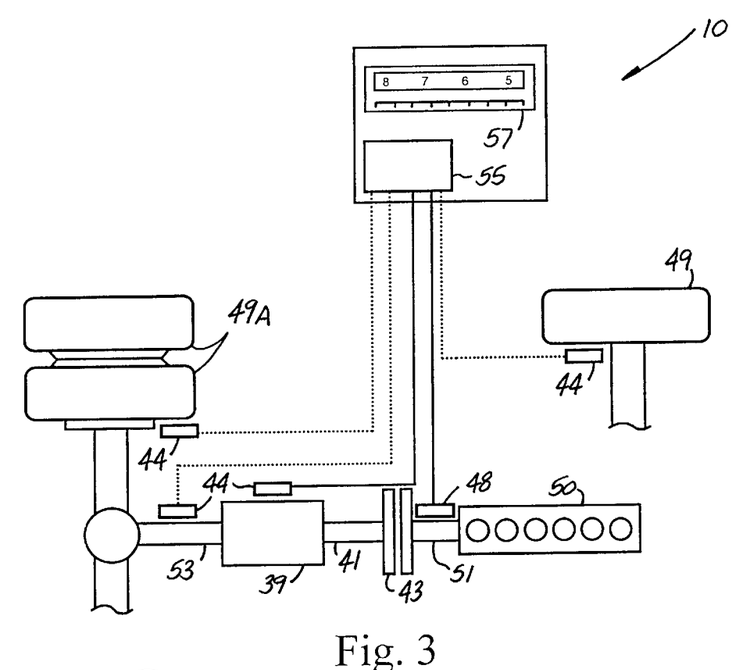
FIG. 3 is a schematic plan view showing the manner in which the gear availability indicator is electrically connected to a vehicle.

An important feature of the present invention is that the gear availability indicator can be connected to existing vehicle pulse-type sensors (which are usually Hall-effect sensors) that are representative of engine speed and vehicle speed. As shown in FIG. 3, the engine speed sensor 48 can be mounted proximal to the engine output shaft 51 and adapted to generate a pulse with each revolution of the output shaft 51 in order to provide engine speed information. This sensor also could be mounted to the input shaft 41 of the transmission 39 (i.e., downstream of clutch 43). However, the upstream location indicator is preferred, since engine speed information would be lost when the clutch is disengaged. Further, most trucks already have an engine speed sensor in that location and the indicator can be attached to the existing sensor without requiring a new one. The vehicle speed sensor 44 can be attached adjacent to a freewheeling or driven vehicle wheel 49 or 49A so as to generate a pulse with each revolution of the vehicle wheel. In a preferred arrangement, the vehicle speed sensor 44 is mounted on the transmission and in proximity to the gear wheel (not shown) of the transmission output shaft 53. The sensor 44 generates an electrical pulse each time a tooth from the gear rotates past the sensor so as to measure the rotation speed of the transmission output shaft 53 which is indicative of vehicle speed. Alternatively, the speed sensor 44 may be mounted proximal to any other rotating component in the drive train between the transmission output shaft and the vehicle wheels.

As shown in FIG. 3, the gear availability indicator 10 receives pulse information from the sensors 44, 48 and processes the information in a central processing unit (CPU) 55. Output from the central processing unit is directed to a display screen 57, which can be one of several types, as discussed below. The CPU includes a memory component, which may be in the form of an EPROM, EEPROM, etc., for storing the computer program, and a non-volatile RAM for storing calibration factors, as will be discussed in greater detail below.

Figure 7:
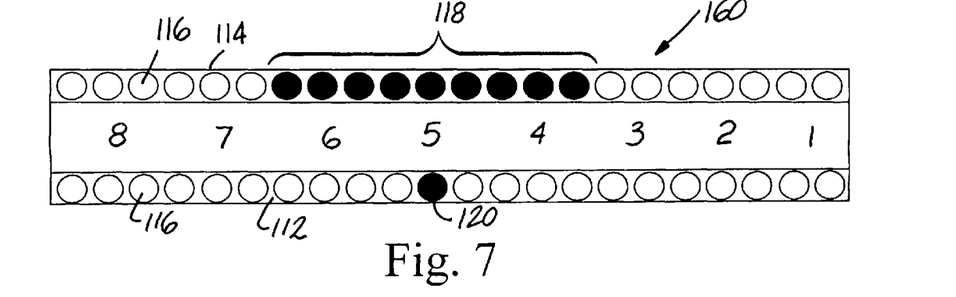
FIG. 7 is an alternative embodiment of the indicator of FIG. 6, using light emitting diodes instead of a CRT display wherein the numbers are fixed and the range indicator moves.

The display screen 57 may be a CRT screen or any other type of display screen that is used for computer display screens or signs. One alternative to a CRT type of screen is a less expensive light emitting diode screen that is capable of forming letters or numerals, such as an alpha-numeric display. A simple band of light emitting diodes or other light elements, as shown in FIG. 7, is also an alternative for at least the second embodiment of the invention.

In the embodiment shown in FIGS. 4A–4E, the display 14 includes a fixed scale 62 at the bottom of a CRT or LED display screen 63. The fixed scale 62 represents engine speed in RPM and can be printed adjacent the display screen 63. A moving indicator 64, shown here as a triangle, scrolls along a display screen row 66 above the vehicle speed scale and is calibrated to reflect the actual gear ratio engaged at the present engine speed in RPM. A row 68 above the moving or scrolling engine speed indicator 64 on the screen 63 displays a moving or scrolling scale 60 of vehicle gear ratios represented by gear symbols, with each gear symbol moving along the scale to reflect the engine speed that would be necessary to engage that gear at the existing vehicle speed. The gear symbols can be in the form of icons, bars, triangles, numbers, letters, etc. In a preferred embodiment, the symbols are in the form of numbers, with each number representing a different gear ratio.

The position of each gear symbol on the scale is calculated by the CPU as a function of vehicle speed. Vehicle speed can be calculated for each gear in the transmission as a product of the speed of the engine times the drive or gear ratio for the entire drive train when the transmission is in a particular gear. Thus, the gear ratio for any gear is the ratio of the engine speed to the vehicle speed while that gear is engaged. Knowing the gear ratio for each gear, one can calculate the engine speed that would be necessary to produce the existing vehicle speed for each gear in the drive train. The CPU does this continuously and displays a numeral representing each of the gears in the transmission at the appropriate engine speed position on the fixed engine speed scale for the existing vehicle speed. With the fixed scale representing the actual operating range for the engine (for example 0 to 2600 RPM), the gears that would be operating in that engine speed range appear on the screen and move or scroll up and down according to the speed of the vehicle. The spacing between each gear number varies as a function of engine RPM and vehicle speed. When the vehicle slows down and the engine speed is reduced, the spacing between the gear symbols on the screen 63 is reduced. Eventually, all of the gear symbols will collapse on 0 (zero) RPM when the vehicle is not moving.

The top row of the screen 63 depicts the desired engine operating range in the form of a bar 72 or other visual indication. This range may be selected by the operator and typically would be between a lower engine idle speed 72A (about 700 RPM) and an upper limit 72B (frequently about 2,000 RPM). This range can be entered in the CPU and presented on the display screen as a part of the electronic display, as shown in FIGS. 4A–4E. Alternatively, mechanical indicator arrows 74 that slide along a rail 76 at the edge of the screen can be employed to mechanically set visual limits (FIG. 5). It is to be understood that the range display can be positioned at other locations on the display than that depicted in FIGS. 4A–4E, such as between the gear symbols and the moving indicator, as shown in FIGS. 1 and 3.

In addition, the display, as shown in FIG. 5, can include an electronic speedometer display 78, with a scrolling cursor or position marker 80 indicating speed on a fixed scale 82. Vehicle speed 84, engine speed 86 and the actual gear engaged 88 also can be represented digitally on the display screen.

Figure 4A:
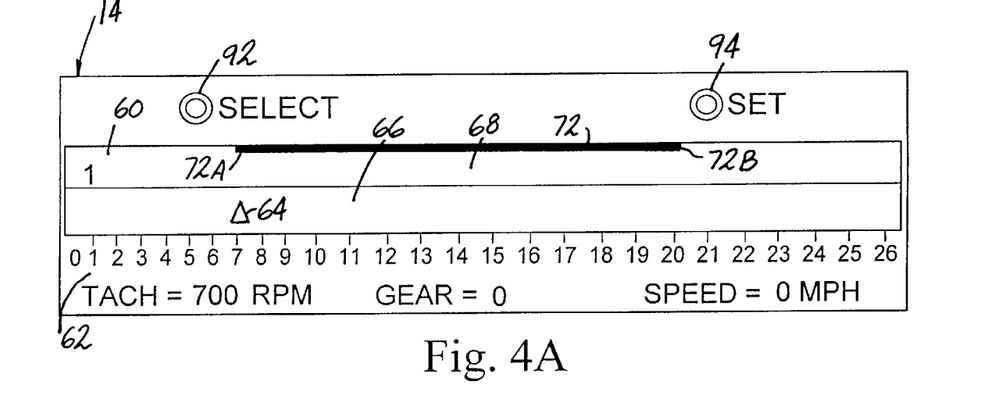
FIGS. 4A–4E are views of one embodiment of the gear availability indicator display screen at various engine speed and vehicle speed conditions.

The operation of the invention is illustrated in FIGS. 4A–4E. In FIG. 4A, the vehicle is at rest and the engine is idling at 700 RPM. The operator has preselected the operating range from 700 RPM to 2,000 RPM. Since the vehicle is at rest, none of the gears would be within the range if they were engaged at this point. Thus, it is necessary to depress the clutch in order to engage a gear.

Figure 4B:
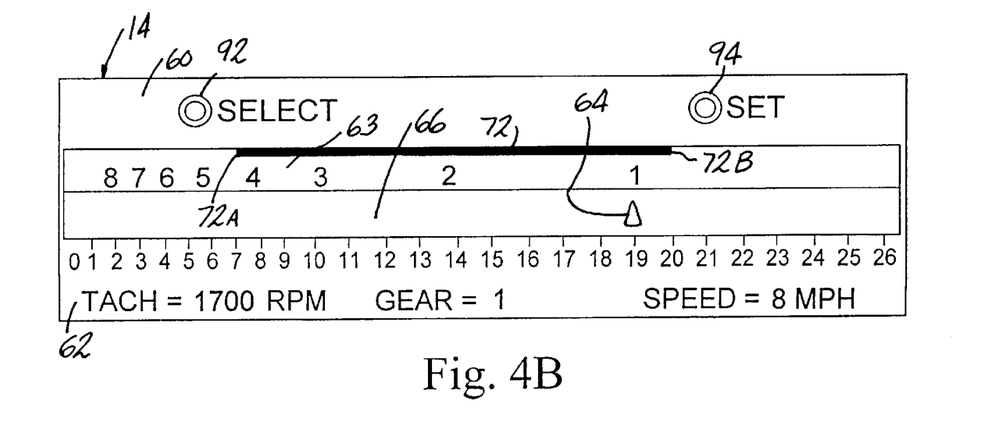
Figure 5:
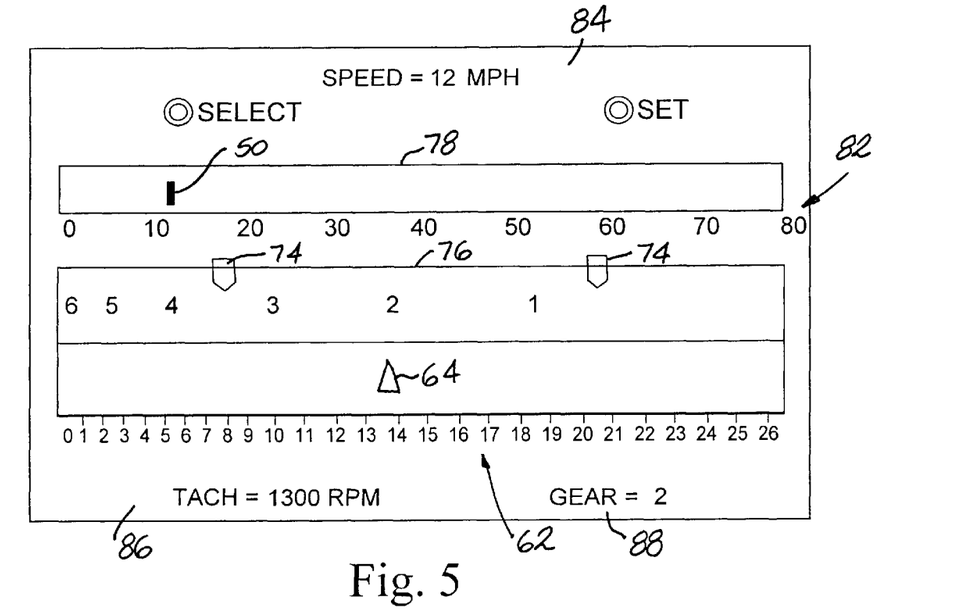
FIG. 5 is a modified display screen that contains a vehicle speed display and employs manually movable range indicators.

When first gear is engaged and the operator has started moving, the display has the configuration of FIG. 4B. There, the engine speed indicator is positioned opposite the gear symbols as represented by numeral 1 (because the transmission is engaged in first gear), and numeral 1 moves to the right on the scale as engine speed increases, successively followed by the other gear numbers. When engine speed reaches the upper end 72B of the preselected limit, the other gears available within the permissible range 72 are visible in the range. Thus, if the operator desires to switch gears with the vehicle operating as in FIG. 4B, only gears 2 and 3 are available within the selected operating range 72. As vehicle speed increases, the numerals scroll to the right, and higher gear numbers appear within the permissible range 72.

Figure 4C:
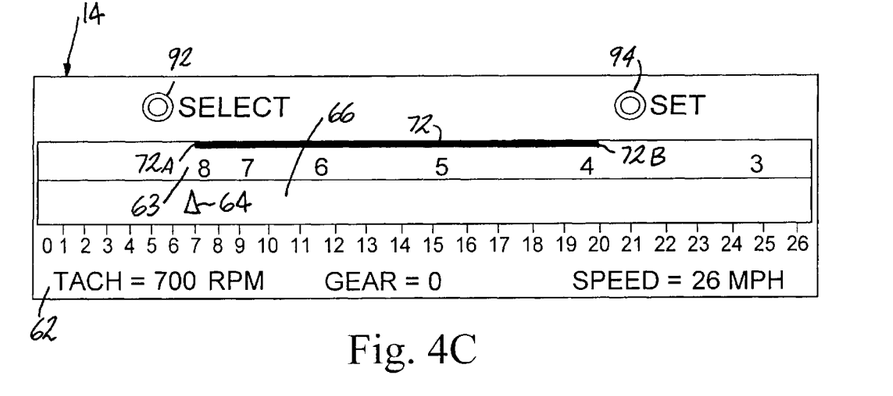

In FIG. 4C, the vehicle is now coasting at 26 miles per hour. The operator has taken his foot off the accelerator, and the engine is idling at 700 RPM. At that vehicle speed, the operator can select gears 4, 5, or 6 within the permissible engine speed range. However, since 700 RPM is too low to shift into one of these gears, the engine speed must be increased to about 820 RPM to shift smoothly into 6th gear. Alternatively, the engine speed can be increased to about 1200 RPM to shift smoothly into 5th gear. Finally, the engine speed can be increased to about 1750 RPM to shift smoothly into 4th gear. Advantageously, it is no longer necessary to use the clutch during shifting, since the engine speed for a particular gear can be matched with great accuracy. All the operator has to do is match the position of the engine speed triangle indicator with the gear number in order to determine when the transmission can be shifted into the designated gear.

Figure 4D:
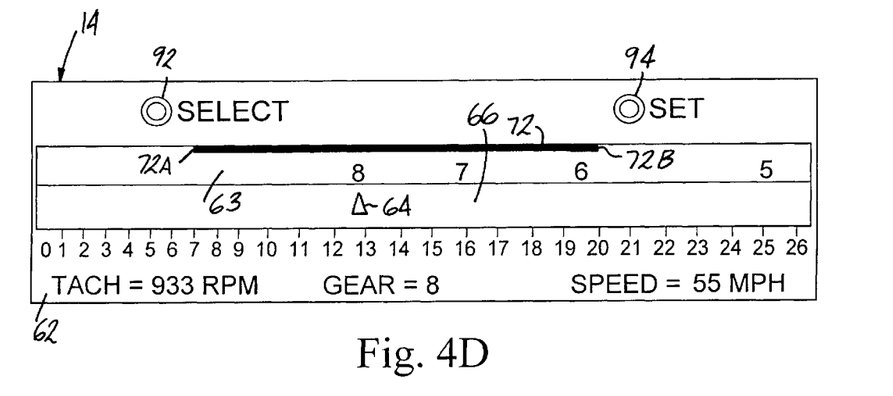

In FIG. 4D, the vehicle is now cruising at 55 mph, with its engine turning at 933 RPM. If the vehicle comes to a slight incline, the operator knows instantly by looking at the display screen 63 that the vehicle can be shifted into 7th or 6th gear. If the vehicle comes to a slight downward incline, he can downshift into 7th or 6th gear within the permissible engine speed range 72, thereby causing the engine to slow down the vehicle without operating the brakes. Again, the operator need only glance at the display in order to determine what gears are available and the engine speed indicator can be matched with the appropriate gear during a double clutching operation in order to determine the appropriate engine speed to shift into the lower gear. This is an especially important feature in a panic situation where vehicle speed must be braked to the maximum extent possible by downshifting.

Figure 4E:
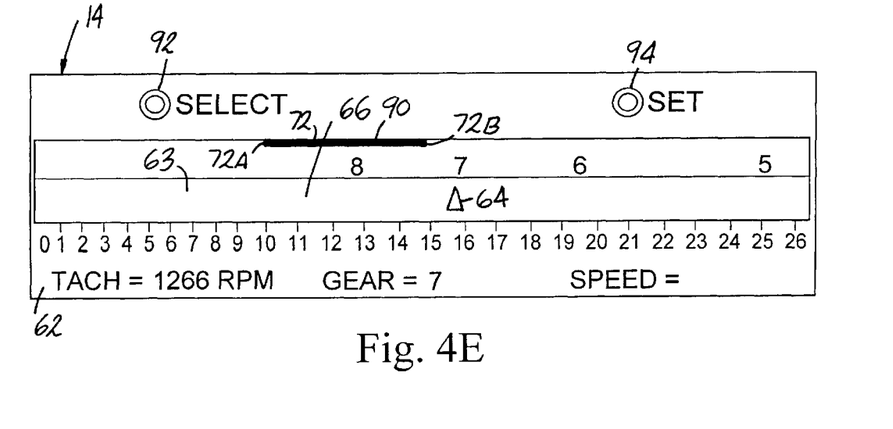

FIG. 4E illustrates a display employing a narrower operating range 90. This may be used to indicate the range where the engine develops more torque or is more efficient. In this instance, the vehicle is in 7th gear and there are no other gears within the desired operating range.

A very important feature of the present invention is that the indicator mechanism does not have to be manufactured or factory set to match the gear ratios of any particular vehicle or transmission. Instead, the indicator can easily be calibrated or recalibrated by the operator in any vehicle, using two calibration push-button switches, a select switch 92 and a set switch 94 (see FIG. 1). A single switch or more than two switches could be employed, but the process can be performed most conveniently with two switches. The switches 92, 94 are connected to the CPU to select calibration options and to store the settings.

To calibrate or recalibrate the indicator for any vehicle, the following procedure is followed:

1. First, the select switch 92 is depressed, and a vehicle speed calibration screen appears. The instructions will be to operate the vehicle at a given speed, such as at 10 miles per hour. When the vehicle reaches that speed, the set switch 94 is pushed, and the internal speedometer of the indicator mechanism 10 is thereby calibrated to the actual speed of the vehicle.

2. The select switch 92 is again pressed to call up the engine speed calibration. The operator is instructed to rev the engine to a preselected setting, such as 1000 RPM, and the set switch is again depressed. This calibrates the RPM setting of the indicator 10.

3. The select switch 92 is again depressed to call up the screen for calibrating the gears. To calibrate first gear, the operator is instructed to drive the vehicle in first gear at any speed and press the set switch 94. When this is done, the operator is instructed to shift to 2nd gear drive at any speed and depress the set switch, and so on through all of the gears. As soon as the set switch is depressed for each of the gears, the effective gear ratio or drive ratio for each gear is calibrated. As a result, it is unnecessary to know the actual gear ratio or other particular parameters of the vehicle.

With this simple calibration mechanism, the indicator can be installed in a vehicle and calibrated in a matter of minutes simply by alternately depressing the select and set switches.

Figure 6:
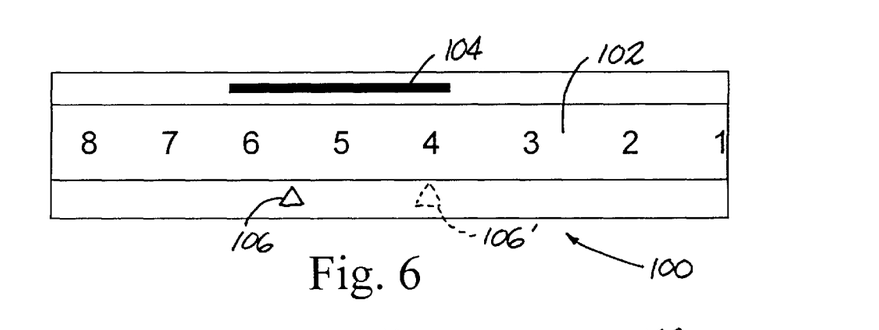
FIG. 6 is a view of the display screen of a second embodiment of a gear availability indicator.

Another embodiment 100 of a simplified display for the present invention is shown in FIG. 6. In this embodiment, the numbers of the gears do not scroll across the screen. Rather, the gear numbers occupy a fixed scale or row 102 that either appears on the display screen, or preferably is printed on a bar that extends across the display. A visual bar 104 representing the gear availability range scrolls across the screen adjacent to the fixed gear numbers. Thus, the gear availability bar is constantly positioned adjacent the gears that are available.

The display also includes a "gear ratio" cursor or position marker 106 (such as an arrow or triangle) that represents the ratio between vehicle speed and engine speed. This ratio will identify a particular gear when the vehicle is engaged in that gear. Thus, if the vehicle is in 4th gear, the indicator will be positioned adjacent the 4 on the scale, as shown by phantom indicator 106'. If the vehicle is in neutral or the clutch is depressed, the ratio between vehicle speed and engine speed becomes variable, as represented by position marker 106. Thus, the indicator really represents the gear ratio that would be applicable if the vehicle were in gear at a particular vehicle speed and engine speed. The ratio between the engine speed and vehicle speed can be considered to be the effective gear ratio. This display is connected to a CPU and sensors in the same manner as the display illustrated in FIGS. 4A–4E, and the unit is calibrated in the same manner with set and select push-button switches.

In operation, with the display of FIG. 6, as a vehicle speeds up in first gear, for example, the gear indicator will be positioned opposite the numeral 1 on the scale, while the moving gear availability bar 104 moves to the left, covering gears 2 and 3 or whatever other gears are available within the desired engine speed range. When the gear is shifted to gear 2 and acceleration continues, the bar continues to move to the left until gear 2 reaches its maximum engine speed, then the gear is shifted to some other gear that falls within the permissible shift range. The operator knows when he can shift into a gear when the gear ratio cursor is positioned opposite a gear number on the scale. This display does not indicate actual RPMs or actual vehicle speed but simply indicates the gear the vehicle can be shifted into and the range of gears to which the vehicle may be shifted at the existing vehicle speed within a particular engine speed range.

An advantage of this embodiment of the invention is that it is simple and less expensive than the embodiment of FIG. 4. Since it is not necessary to display any numerals on a display screen, a less complicated display screen capable of displaying only a triangle or a moving bar is all that is required. By eliminating the necessity to scroll numerals and by limiting the size of the display, the cost of this unit can be reduced significantly.

Another display 110 for implementing the system of FIG. 6 is shown in FIG. 7. In this display, the gear ratio indicator 112 and the gear availability indicator 114 are provided by a series of individual light emitting diodes 116 or other light sources in a row. The LEDs may be illuminated to provide a gear availability band 118 that moves along the row, and the gear indicator light can be a single LED 120 on the bottom row. This minimizes the cost of the display and yet provides useful information in a display of modest cost.

Figure 8:
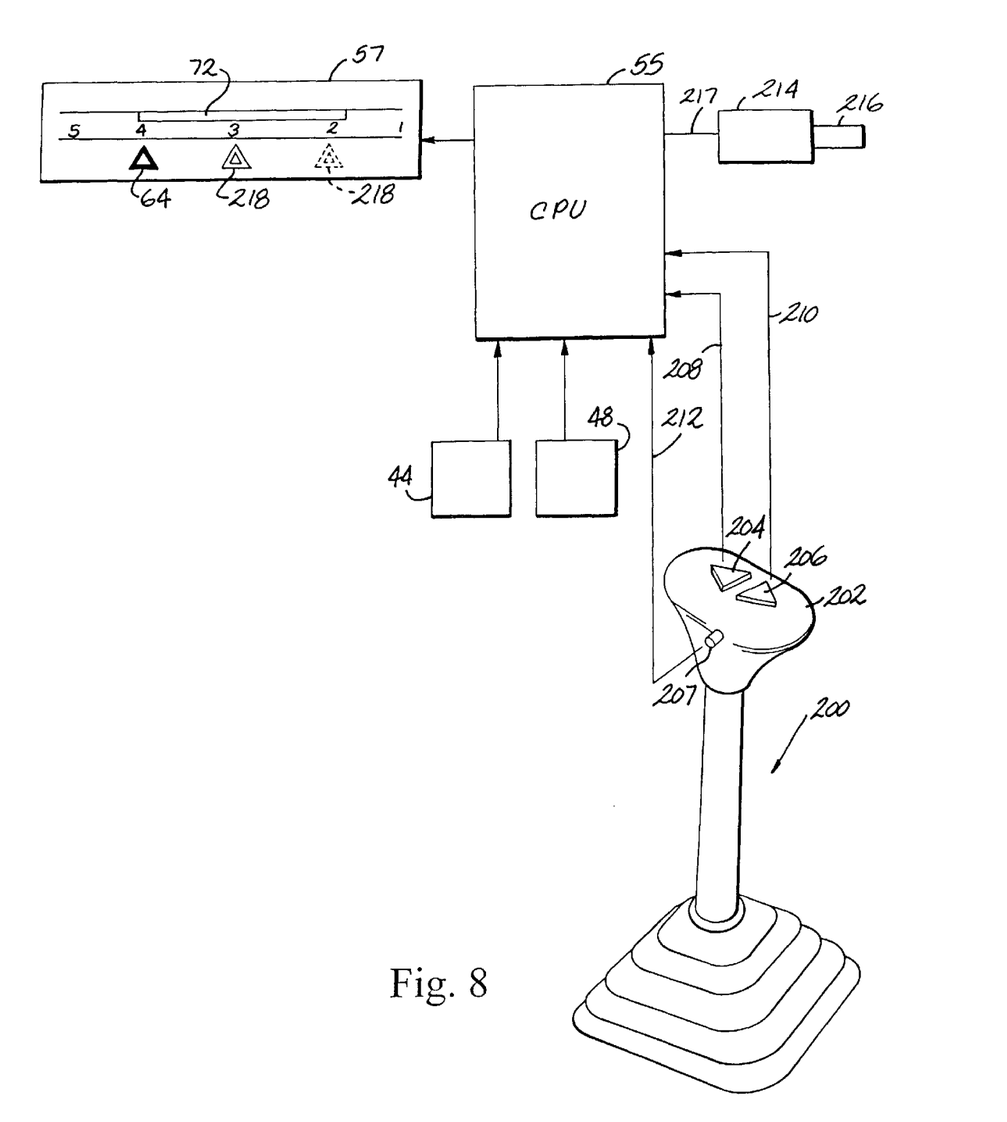
FIG. 8 is a schematic diagram of an engine speed control and display for automatic synchronized shifting.

With reference now to FIG. 8, a schematic diagram of an engine speed control and display for automatic synchronized shifting is illustrated, wherein like parts in the previous embodiments are represented by like numerals. A manual gear shift lever 200 includes a gear shift knob 202 having an up-shift switch 204, a down-shift switch 206 and an actuator switch 207. The switches 204, 206 and 207 are connected to the CPU 55 through lines 208, 210 and 212 respectively, and are normally biased open to provide a logic pulse when one of the switches are closed. A throttle control mechanism or actuator 214 has a reciprocal shaft or cable 216 that is connected to the carburetor throttle (not shown) or fuel injector control (also not shown) for controlling engine speed based on an output signal from the CPU 55 via the line 208. The throttle control mechanism is a well-known component in cruise control systems and therefore will not be described in further detail.

In operation, and by way of example, the indicator 64 of the display 57 reveals that the vehicle is currently in fourth gear. Likewise, the bar 72 indicates that gears 4, 3 and 2 are currently available within the predetermined engine speed range. When it is desired or becomes necessary to up-shift or down-shift, the appropriate switch 204 or 206 is depressed one or more times until the desired gear from the available gears is obtained. In the present example, it is readily apparent that it is not possible to up-shift the transmission into 5th gear since it is out of the range of safe engine speed. If the operator attempts to depress the up-shift switch 204, an audible beep or visual indicator can alert the operator that the target gear is out of the safe vehicle speed range and therefore cannot be engaged. When the down-shift switch 206 is depressed a first time, an indicator 218 appears under the third gear that is visually distinguishable from the indicator 64. The indicator 218 scrolls in unison with the selected gear as the engine speed varies. If the down-shift switch is depressed a second time, the indicator 218 moves to the second gear position, as represented by dashed lines. If the downshift switch is depressed a third time, an audible error beep or visual error indicator can again alert the operator that the target gear is out of safe vehicle speed range and therefore cannot be engaged. Of course, if other gears are available, the upshift and down-shift switches can be depressed as many times as desired to obtain a target gear. The switches can be depressed while the transmission is in gear or in neutral. If the target gear is selected while the transmission is in gear, the gear lever 200 should be moved to neutral before depressing the actuator switch 207. Once the actuator switch 207 is depressed, the CPU sends an output signal to the actuator 214 to increase or decrease the engine speed and enable smooth shifting into the target gear. Once the appropriate engine speed is obtained within a certain tolerance range, e.g. within 100 RPM or less of the ideal engine speed for the target gear, an audible beep or visual indicator that is distinct from the error beep or error indicator alerts the operator that the transmission can be synchronously shifted into the target gear. Although not shown, an engine brake may also be connected to the CPU 55 to quickly reduce the engine speed during up-shifting.

Reasonable variation and modification are possible within the spirit of the foregoing specification and drawings without departing from the scope of the invention.

The embodiments for which an exclusive property or privilege is claimed are defined as follows:

1. A gear availability indicator for multi-gear transmissions of motor vehicles, comprising:
    a signal processing unit for receiving input signals representative of vehicle speed and engine speed and for determining a gear ratio value representative of the relationship between vehicle speed and engine speed for each gear in the vehicle transmission and for generating output signals for operation of a display, said display comprising:
        a first section displaying a range of acceptable engine speeds; and
        a second section displaying at least one gear symbol representative of at least one gear ratio value, the displayed range of acceptable engine speeds and the at least one displayed gear symbol being relatively moveable;
        wherein mutual alignment of the displayed range of acceptable engine speeds and the at least one displayed gear symbol indicates that at least one gear represented by the at least one gear ratio value is available for engagement in the transmission.

2. The gear availability indicator according to claim 1 wherein the second section displays a plurality of gear symbols representative of a plurality of gear ratio values, and wherein mutual alignment of at least a portion of the displayed plurality of gear symbols and the displayed range of acceptable engine speeds indicates that any gear represented by the aligned portion of gear symbols is available for engagement in the transmission.

3. The gear availability indicator according to claim 2 wherein the displayed range of engine speeds is stationary and the plurality of displayed gear symbols are scrollable past the stationary range.

4. The gear availability indicator according to claim 3 wherein the amount of relative movement between the stationary range and the scrolling gear symbols is a function of the speed of the vehicle.

5. The gear availability indicator according to claim 4 wherein the display further comprises a third section having a scrolling engine speed indicator, and wherein alignment of the indicator with one of the scrolling gear symbols indicates that the transmission is either in a gear as represented by the one scrolling gear symbol or can be synchronously shifted into that gear.

6. The gear availability indicator according to claim 5 and further comprising:
    at least one switch electrically connected to the signal processing unit and actuable by a vehicle operator to specify a target gear within the range of available displayed gear symbols; and
    an actuator adapted for connection to an engine speed control of the vehicle and responsive to output signals from the signal processing unit based upon a specified target gear to adjust engine speed;
    whereby engine speed is automatically adjusted to permit synchronous shifting of the transmission into the specified target gear.

7. The gear availability indicator according to claim 2 and further comprising:

at least one switch electrically connected to the signal processing unit and actuable by a vehicle operator to specify a target gear within the range of available displayed gear symbols; and an actuator adapted for connection to an engine speed control of the vehicle and responsive to output signals from the signal processing unit based upon a specified target gear to adjust engine speed;

whereby engine speed is automatically adjusted to permit the synchronous shifting of the transmission into the specified target gear.

8. The gear availability indicator according to claim 2 wherein the plurality of displayed gear symbols are stationary and the displayed range of engine speeds is scrollable past the stationary gear symbols.

9. The gear availability indicator according to claim 8 wherein the amount of relative movement between the stationary gear symbols and the scrolling range is a function of the speed of the vehicle.

10. The gear availability indicator according to claim 9 wherein the display further comprises a third section having a scrolling engine speed indicator, and wherein alignment of the indicator with one of the stationary gear symbols indicates that the transmission is either in a gear as represented by the one stationary gear symbol or can be synchronously shifted into the gear.

11. The gear availability indicator according to claim 1 wherein the amount of relative movement between the range of acceptable engine speeds and the at least one gear symbol is a function of the speed of the vehicle.

12. The gear availability indicator according to claim 1 wherein the display further comprises a third section having a scrolling engine speed indicator, and wherein alignment of the indicator with the at least one gear symbol indicates that the transmission is either in a gear as represented by the gear symbol or can be synchronously shifted into the gear.

13. A method of calibrating the gear availability indicator of claim 1 to a vehicle having an engine and a multi-gear transmission, comprising:

operating the vehicle at a predetermined speed and recording said vehicle speed in the signal processing unit;

operating the engine at a predetermined speed and recording said engine speed in the signal processing unit;

operating the vehicle with the transmission engaged in one of the gears while monitoring the vehicle speed and engine speed in the signal processing unit; and calculating a gear ratio for the engaged gear from the monitored vehicle speed and engine speed.

14. A method according to claim 13 wherein the steps of operating the vehicle with the transmission engaged in one of the gears and calculating a gear ratio for the engaged gear are performed for each of the remaining gears in the multi-gear transmission.

15. A method of calibrating a gear availability indicator for a vehicle having an engine and a multi-gear transmission, the indicator including a signal processing unit for receiving input signals representative of vehicle speed and engine speed and for determining a gear ratio value representative of the relationship between vehicle speed and engine speed for each gear in the vehicle transmission and for generating output signals for operation of a display, comprising:

operating the vehicle at a predetermined speed and recording said vehicle speed in the signal processing unit;

operating the engine at a predetermined speed and recording said engine speed in the signal processing unit;

operating the vehicle with the transmission engaged in one of the gears while monitoring the vehicle speed and engine speed in the signal processing unit; and calculating a gear ratio for the engaged gear from the monitored vehicle speed and engine speed.

16. A method according to claim 15 wherein the steps of operating the vehicle with the transmission engaged in one of the gears and calculating a gear ratio for the engaged gear are performed for each of the remaining gears in the multi-gear transmission.

17. A method of displaying information useful in changing gears in a manually operated multi-gear transmission of a motor vehicle, comprising:

providing an indicator having a display controlled by a signal processing unit, the signal processing unit adapted for receiving signals representative of vehicle speed and engine speed and for determining a gear ratio value representative of the relationship between vehicle speed and engine speed for each gear in the vehicle transmission and for generating output signals for operation of the display;

displaying a range of acceptable engine speeds and at least one gear symbol representative of at least one gear ratio value on the display; and moving one of the displayed range and the at least one displayed gear symbol with respect to the other of the displayed range and the at least one displayed gear symbol;

wherein mutual alignment of the displayed range of acceptable engine speeds and the at least one displayed gear symbol indicates that at least one gear represented by the at least one gear symbol is available for engagement in the transmission.

18. A method of displaying information according to claim 17 wherein the step of displaying at least one gear symbol includes displaying a plurality of gear symbols representative of a plurality of gear ratio values, and wherein mutual alignment of at least a portion of the displayed plurality of gear symbols and the displayed range of acceptable engine speeds indicates that any gear represented by the aligned portion of gear symbols is available for engagement in the transmission.

19. A method of displaying information according to claim 18 wherein the step of moving includes scrolling the plurality of gear symbols past the range of acceptable engine speeds.

20. A method of displaying information according to claim 19 and further comprising the step of displaying a scrolling engine speed indicator on the display, and wherein alignment of the indicator with one of the scrolling gear symbols indicates that the transmission is either in a gear as represented by the one scrolling gear symbol or can be synchronously shifted into the gear.

21. A method of displaying information according to claim 17 wherein the step of moving includes scrolling the at least one gear symbol past the range of acceptable engine speeds.

22. A method of displaying information according to claim 17 wherein the step of moving includes scrolling the range of acceptable engine speeds past the at least one gear symbol.

* * * * *